United States Patent [19]

Horiuchi

[11] Patent Number: 4,625,219

[45] Date of Patent: Nov. 25, 1986

[54] VIDEO SIGNAL GENERATING APPARATUS FOR LASER BEAM PRINTER

[75] Inventor: Yuichi Horiuchi, Hitachi, Japan

[73] Assignee: Hitachi, Ltd., Tokyo, Japan

[21] Appl. No.: 669,438

[22] Filed: Nov. 8, 1984

[30] Foreign Application Priority Data

Nov. 11, 1983 [JP] Japan .................................. 58-210775

[51] Int. Cl.⁴ ........................ C01D 9/42; C01D 15/14; H01N 1/10
[52] U.S. Cl. .................................... 346/108; 358/293; 346/160
[58] Field of Search ................... 346/107 R, 108, 160; 358/293

[56] References Cited

U.S. PATENT DOCUMENTS 4,081,843 3/1978 Okano .................................. 358/293
4,089,008 5/1978 Suga .................................... 346/108

Primary Examiner—E. A. Goldberg
Assistant Examiner—Mark Reinhart
Attorney, Agent, or Firm—Antonelli, Terry & Wands

[57] ABSTRACT

A video signal generating apparatus for a laser beam printer including a dot counter which counts the dots along the horizontal side of a recording area, and a raster counter which counts the dots along the vertical side of the recording areas. In accordance with the outputs of these counters, a character pattern memory produces a character print dot signal, while a set value representing a ruled line size is calculated from the outputs of the dot counter and the raster counter, thus producing a ruled line signal. These two signals are combined to make up a video signal.

6 Claims, 7 Drawing Figures

| A | B | C | X | Y |
|---|---|---|---|---|
| E | F | G | 15 | 18 |
| I | J | K | 16 | 21 |
| M | N | O | 24 | 17 |

VIDEO SIGNAL GENERATING APPARATUS FOR LASER BEAM PRINTER

The present invention relates to a video signal generating apparatus for laser beam printer, or more in particular to a circuit for generating a video signal containing a ruled line print dot signal.

A laser beam printer using the xerography process is well known as disclosed in the U.S. Pat. No. 4,383,755 by Richard C. Fedder, et al, and U.S. Pat. No. 4,384,297 by Yuji Ohara, et al.

A disadvantage of the conventional laser beam printers will be described with reference to FIGS. 1 to 4.

Figure 1:
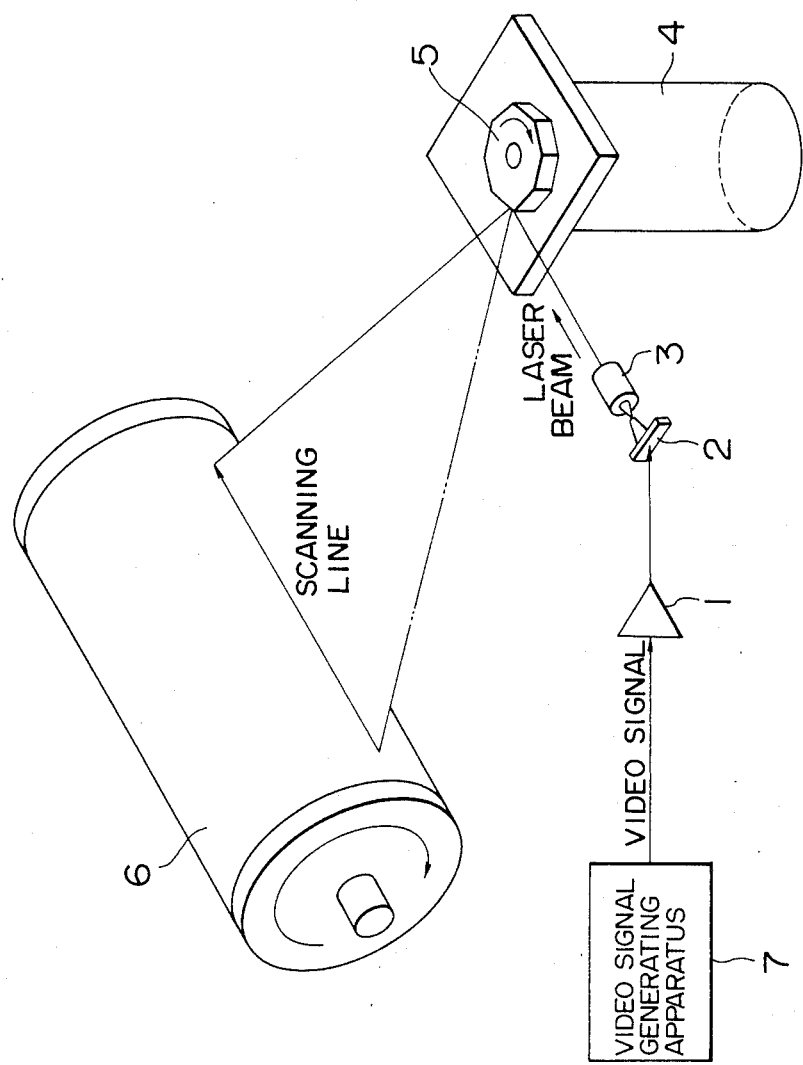

The operating principle of a laser beam printer is shown in FIG. 1. This printer comprises a video signal generating apparatus 7 for generating a video signal to be printed, a laser diode 2 the luminescence of which is modulated and controlled by an output from a video amplifier 1 for amplifying the video signal produced by the video signal generating apparatus 7, a coupling lens 3 for adjusting the light-emitting beam of the laser diode 2, a scanner motor 4, and a polygon mirror 5 driven by the scanner motor 4. The photo-sensitive surface of the drum 6 is scanned by a laser beam 8 to produce an image by the xerography process.

The video signal generating apparatus 7 of this laser beam printer generates a video signal in accordance with the horizontal scanning position of the beam spot and the rotational position of the drum 6.

Figure 2:
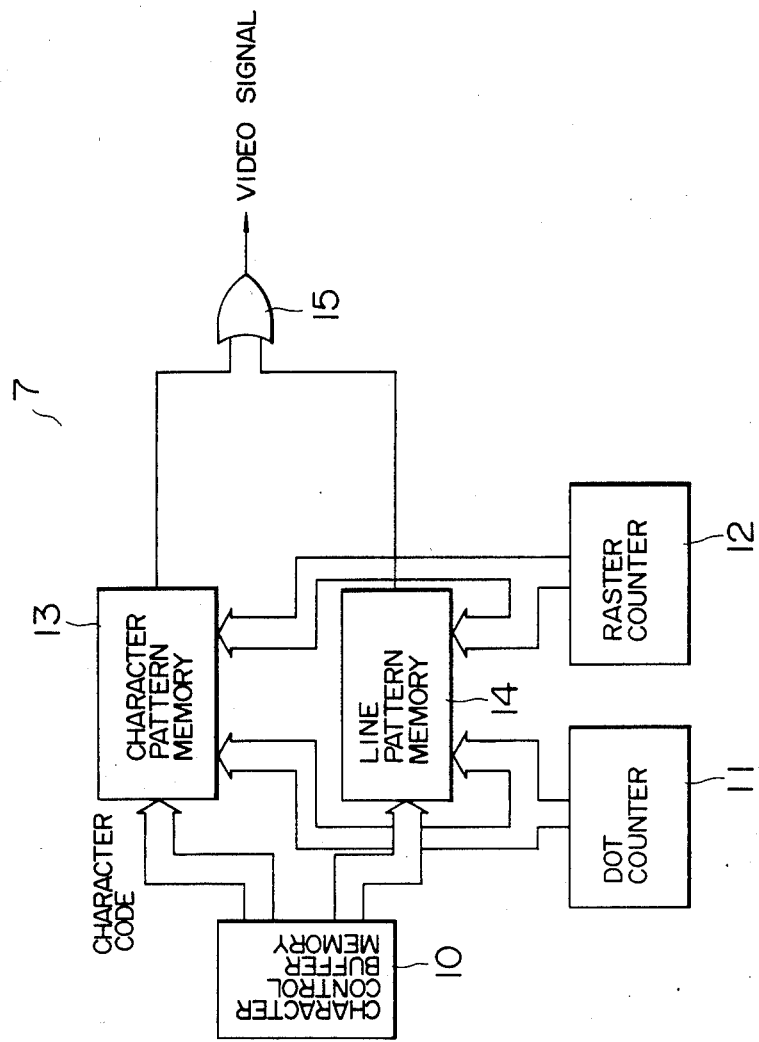

A detailed block diagram of the video signal generating apparatus is shown in FIG. 2. An output of a character control buffer memory 10 having character codes and character attributes stored therein is applied to a pattern memory 13. Character pattern dots selected by the output of a dot counter for counting the number of dots in each character pitch and a raster counter 12 for counting the number of rasters in each line pitch are produced from the character pattern memory 13 and modulate the luminescence of the laser diode 2 as a video signal.

Figures 3, 4:
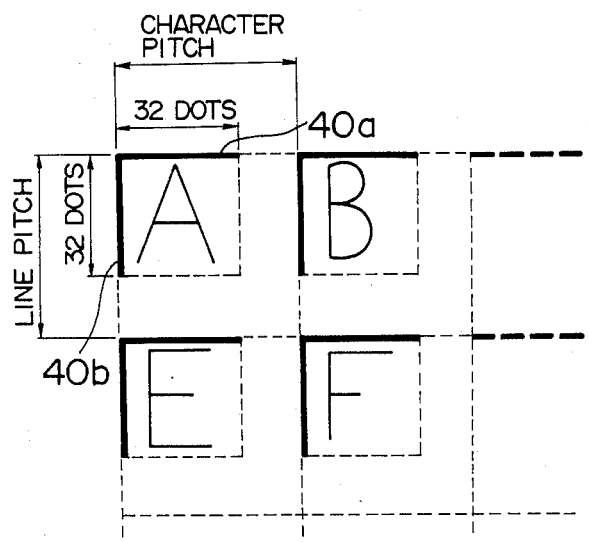

In printing a table 40 as shown in FIG. 3 by use of this laser beam printer, it is necessary to generate ruled lines 40a and 40b. A line pattern memory 14 shown in FIG. 2 is provided for this purpose. In response to an output from the character control buffer memory 10, the attribute of the character, that is, the type of ruled line is selected from the line pattern memory 14, so that the output of the line pattern memory 14 and that of the character pattern memory 13 are combined in a logic product (OR) circuit 15 to make up a video signal for printing the table and character.

The character pattern memory 13 of this video signal generator circuit has a storage area of 32 dots by 32 dots per character. In the case where the line pattern memory 14 also has a dot configuration of 32 by 32, therefore, an attempt to print ruled lines with the character pitch of 33 dots or more and the line pitch of 33 dots or more fails to print the lines in excess of 32 dots as shown in FIG. 4.

A line pattern memory is therefore required which memory has a maximum dot configuration which is capable of being designated as a character pitch and a line pitch. Also, the lines printed on the ruled right side and under the character have different positions with different character and line pitches. This results in a greatly increased number of types of ruled line patterns and requires the line pattern memory 14 to be of large capacity.

The object of the present invention is to provide a video signal generating apparatus for a laser beam printer of a simple circuit configuration which generates a ruled line print dot signal at desired character and line pitches.

According to the present invention, there is provided a video signal generating apparatus comprising comparator means for comparing the output value of a dot counter for counting the dots along the horizontal side of a character pattern and/or the output value of a raster counter for counting the dots along the vertical side thereof with a set value representing the size of a ruled line, and a combining means for combining the output of the comparator means with that of a character memory and generating a video signal containing a ruled line print dot signal.

Figure 5:
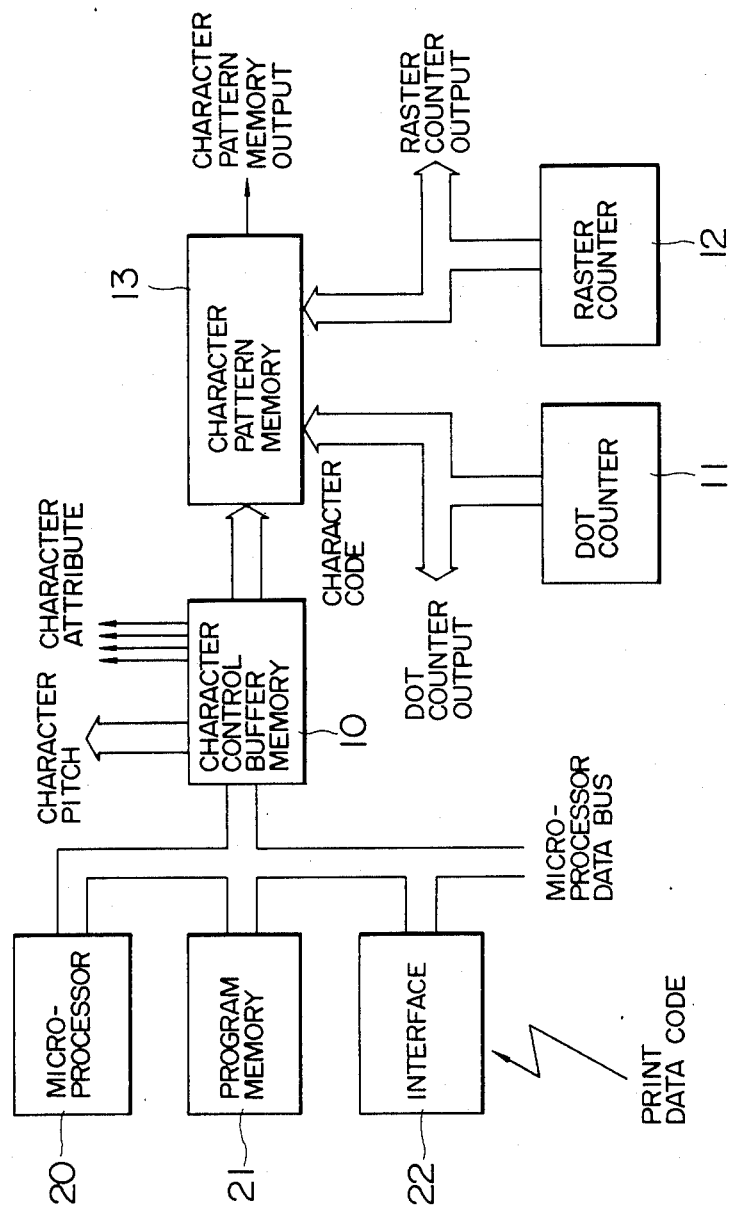
Figure 6:
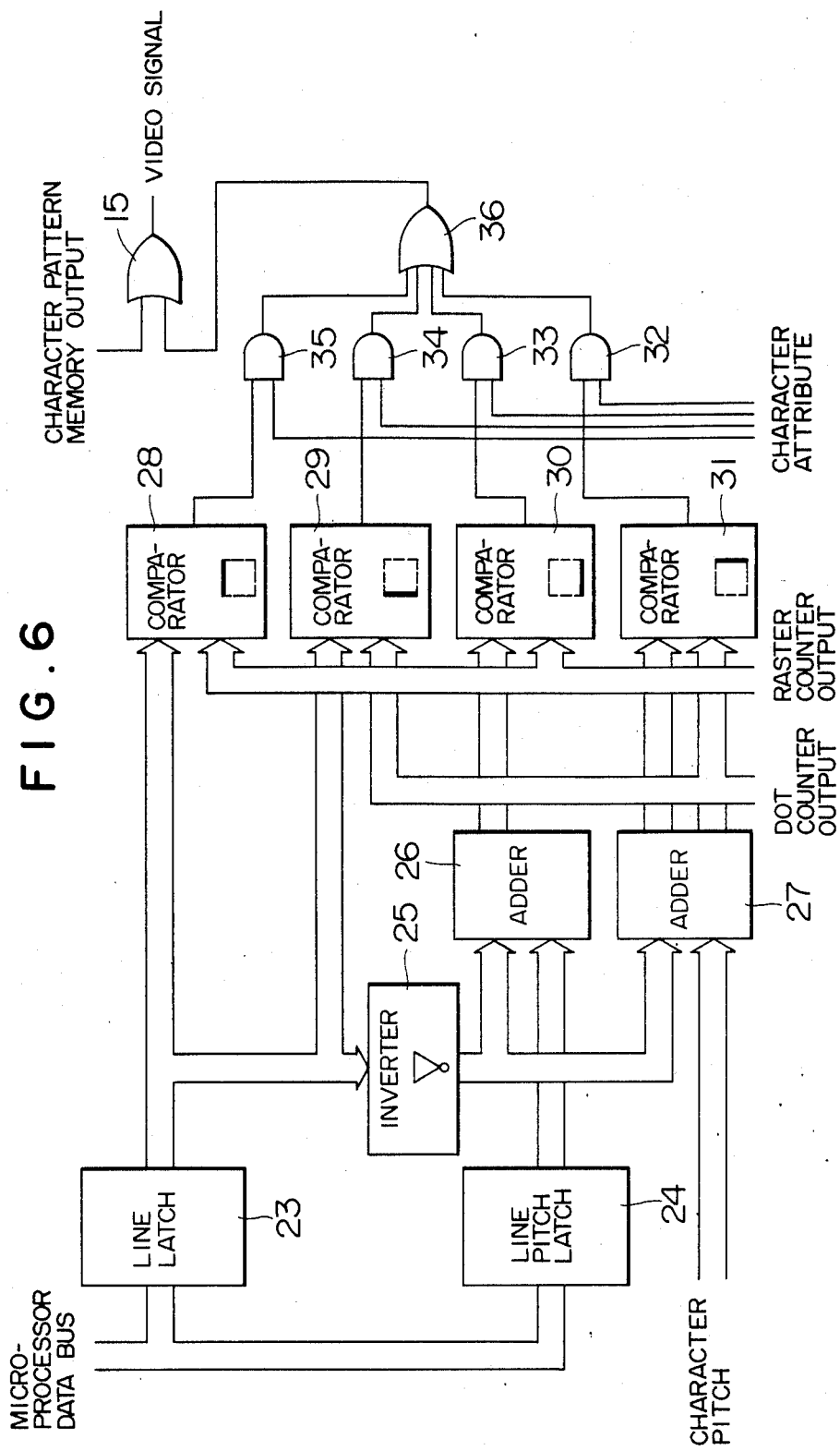
Figure 7:
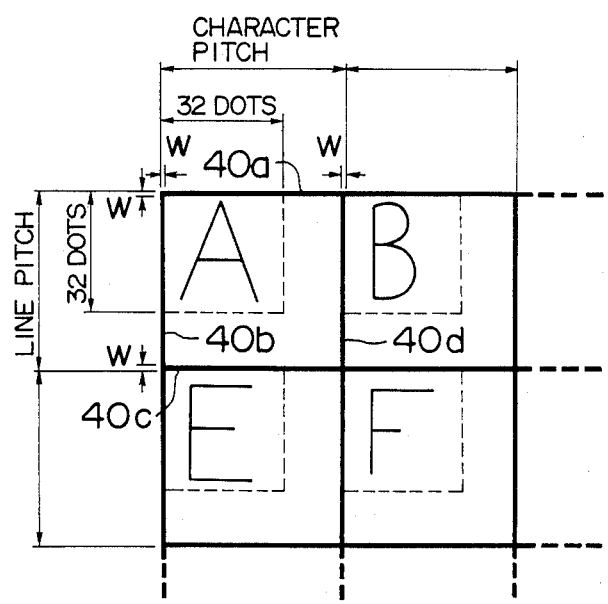

The present invention will be apparent from the following detailed description taken in conjunction with the accompanying drawings, in which:

FIGS. 1 to 4 show a conventional laser beam printer, in which FIG. 1 is a schematic diagram showing a general configuration of a laser beam printer, FIG. 2 a circuit diagram of a video signal generating apparatus, FIG. 3 a pattern image to be recorded, and FIG. 4 a recorded image; and FIGS. 5 to 7 show a video signal generating apparatus according to an embodiment of the present invention, in which FIGS. 5 and 6 show circuit diagrams, and FIG. 7 a recorded image.

Reference is made to FIGS. 5 and 6 showing a configuration of a video signal generating apparatus. Numeral 20 designates a microprocessor which is operated according to a program stored in a program memory 21. Numeral 22 designates an interface circuit for receiving a print data code from a host computer. Numeral 10 designates a character control buffer memory which receives such control codes as the character code necessary for printing a line, the character pitch indicated by the number of dots, the attribute of the character from the microprocessor. A character pattern stored in the character pattern memory 13 is read upon instructions of the character code produced from the character control buffer memory 10, the output of the dot counter 11 indicating the dot positions of the character along the horizontal side, and the output of the raster counter 12 indicating the dot positions of the character along the vertical side.

The microprocessor 20, upon application thereto of a code for drawing a ruled line and printing a character from a host computer through the interface 22, writes the type of the ruled line designated by the computer into the character control buffer memory 10 as the attribute of the character, writes the data indicating the ruled line size in the form of the number of dots into a line latch 23, and also writes a line pitch indicated by the number of dots into a line latch 24.

The circuit operation will be now described with reference to FIG. 7.

(1) Generation of the ruled print dot signal for the ruled line above the character An output value N representing the ruled line size latched in the line latch 23 is compared with the output value of the raster counter 12 at a comparator 28. Only when the output value of the raster counter 12 is smaller than that of the line latch 23, the comparator 28 produces a "high" signal. When the print of the ruled line above the character is ordered as an attribute of the character by the character control buffer memory 10, the output of the comparator 28 is applied through an AND circuit 35 and an OR circuit 36 to an OR circuit 15 where it is combined with the output of the character pattern memory 13 to produce a video signal for printing the ruled line 40a by modulation of the luminescence of the laser diode 2.

(2) Generation of a ruled line print dot signal on the left side of character

An output value W of the line latch 23 is compared with an output value of the dot counter 11 at a comparator 29, and only when the output of the dot counter 11 is smaller than that of the latch 23, the comparator 29 produces a ruled line signal of "high" level. When the print of the ruled line on the left side of the character is ordered as an attribute of the character by the character control buffer memory 10, the output of the comparator 29 is applied through an AND circuit 34 and an OR circuit 36 to the OR circuit 15, where the signal is combined with an output of the character pattern memory 13 to make up a video signal for printing a ruled line 40b by modulation of the luminescence of the laser diode 2.

(3) Generation of a ruled line print dot signal for the ruled line under the character An output W of the line latch 23 inverted by an inverter 25 is added to an output of a line pitch latch 24 at an adder 26, which produces a ruled line pitch less the ruled line size. This value is compared with an output value of the raster counter 12 at a comparator 30, so that only when the value of the raster counter 12 is larger, the comparator 30 produces a line signal of "high" level. When the print of the ruled line under the character is ordered as an attribute of the character by the character control buffer memory 10, the output of the comparator 30 is applied through an AND circuit 33 and an OR circuit 36 to an OR circuit 15, where the signal is combined with an output of the character pattern memory 13 to form a video signal for printing a ruled line 40c by modulation of the luminescence of the laser diode 2.

(4) Generation of a ruled line print dot signal for the ruled line on the right side of character The output of the line latch 23 inverted by the inverter 25 is added to the character pitch produced from the character control buffer memory 10 at the adder 27, which produces a character pitch less the ruled line size. The output of the adder 27 is compared with the output value of the dot counter 11, so that only when the output of the dot counter 11 is larger, the comparator 31 produces a ruled line signal of "high" level. When the print of a ruled line on the right side of the character is ordered as an attribute of the character by the character control buffer memory 10, the output of the comparator 31 is applied through an AND circuit 32 and an OR circuit 36 to the OR circuit 15, where the signal is combined with the output of the character pattern memory 13 to form a video signal for printing a ruled line 40d by modulation of the luminescence of the laser diode 2.

In printing the ruled lines 40a to 40d, the line latch 23 may be set or changed to a value common to all the ruled lines or independent of each other.

It will thus be understood from the foregoing description that according to the present invention, it is possible to generate a ruled line print dot signal with a desired character pitch and line pitch, thus eliminating a pattern memory of large capacity for storing ruled line dot patterns. Each line pattern can be easily realized by a simple configuration by utilizing a comparator means for comparing the output of a dot counter or a raster counter with a value representing the size of a ruled line.

I claim:

1. In a video signal generating apparatus for a laser beam printer, comprising a character control buffer memory for storing codes and attributes of characters, a dot counter for counting the dots along a horizontal side of a character, a raster counter for counting the dots along a horizontal side of a character, a raster counter for counting the dots along a vertical side of the character, and a character pattern memory for selecting a character pattern and reading dot data in response to outputs from said dot counter and said raster counter, the improvement further comprising comparator means for comparing a value representing the size of a ruled line in the number of dots thereof with an output value of said dot counter and also with an output value of said raster counter, and combining means for combining outputs of said comparator means and the output of said character pattern memory to output a video signal which includes character dots and ruled line dots.

2. A video signal generating apparatus according to claim 1, wherein said comparator means includes a comparator for comparing the value representing the ruled line size in the number of dots with the value of said raster counter, said comparator generating a ruled line signal when the output value of the raster counter is smaller, said ruled line signal enabling generation of a horizontal ruled line above the character pattern.

3. A video signal generating apparatus according to claim 1, wherein said comparator means includes a comparator for comparing the value representing the ruled line size in the number of dots with the output value of said dot counter, said comparator generating a ruled line signal when the output value of said dot counter is smaller, said ruled line signal enabling generation of a vertical ruled line on the left side of the character pattern.

4. A video signal generating apparatus according to claim 1, wherein said comparator means includes comparator for comparing the value representing a line pitch in the number of dots less than the value representing a ruled line size in the number of dots, with the output value of said raster counter, said comparator generating a ruled signal when the output value of said raster counter is larger, said ruled line signal enabling generation of a horizontal ruled line below the character pattern.

5. A video signal generating apparatus according to claim 1, wherein said comparator means includes a comparator for comparing the value representing a character pitch the number of dots less the value representing a ruled line size the number of dots, with the output value of said dot counter, said comparator generating a ruled line signal when the output value of said dot counter is larger, said ruled line signal enabling generation of a vertical ruled line on the right side of the character pattern.

6. A video signal generating apparatus according to claim 1, wherein said comparator means includes a first comparator for comparing the value representing a ruled line size in the number of dots with the output value of said raster counter, said comparator generating a first ruled line signal when the output value of said raster counter is smaller, said first ruled line signal enabling generation of a horizontal ruled line above the character pattern, a second comparator for comparing the value representing a ruled line size in the number of dots with the output value of said dot counter, said comparator generating a second ruled line signal when the output value of said dot counter is smaller, said second ruled line signal enabling generation of a vertical ruled line on the left side of the character pattern, a third comparator for comparing the value representing a ruled line pitch in the number of dots less the value representing a ruled line size in the number of dots with the output value of said raster counter, said comparator generating a third ruled line signal when the output value of said raster counter is larger, said third ruled line signal enabling generation of a ruled line below the character pattern, and a fourth comparator for comparing the value representing a character pitch in the number of dots less the value representing a ruled line size in the number of dots with the output value of said dot counter, said comparator generating a fourth ruled line signal when the output value of said dot counter is larger, said fourth ruled line signal enabling generation of a vertical ruled line on the right side of the character pattern; and said combining means includes logic circuits for selecting the first to fourth ruled line signals produced from said first to fourth comparators, and logic circuits for combining a ruled signal thus selected with an output signal produced from said character pattern memory.

* * * * *